(12) United States Patent
Wi et al.

(10) Patent No.: US 9,206,792 B2
(45) Date of Patent: Dec. 8, 2015

(54) HYDRAULIC PRESSURE SUPPLY SYSTEM OF AUTOMATIC TRANSMISSION

(71) Applicant: Hyundai Motor Company, Seoul (KR)

(72) Inventors: Taehwan Wi, Bucheon-si (KR); Jin Young Hwang, Busan (KR); Se Hwan Jo, Bucheon-si (KR)

(73) Assignee: Hyundai Motor Company, Seoul (KR)

( * ) Notice: Subject to any disclaimer, the term of this patent is extended or adjusted under 35 U.S.C. 154(b) by 92 days.

(21) Appl. No.: 13/712,785

(22) Filed: Dec. 12, 2012

(65) Prior Publication Data

US 2014/0060677 A1   Mar. 6, 2014

(30) Foreign Application Priority Data

Sep. 3, 2012 (KR) .................. 10-2012-0097301

(51) Int. Cl.
| | |
|---|---|
| *F04B 17/00* | (2006.01) |
| *F04B 49/00* | (2006.01) |
| *F04B 23/04* | (2006.01) |
| *F16H 61/00* | (2006.01) |

(52) U.S. Cl.
CPC ............. *F04B 17/00* (2013.01); *F04B 49/002* (2013.01); *F16H 61/0031* (2013.01); *F04B 23/04* (2013.01); *F16H 2061/0037* (2013.01); *Y10T 137/85978* (2015.04)

(58) Field of Classification Search
CPC ..... F01M 1/02; F01M 1/16; F01M 2001/123; Y02T 10/76; F16H 57/0401; F16H 2047/025; F16H 204/045; F16H 57/0441; F04B 24/04; F04B 49/002

USPC ............. 417/278, 302, 307, 308, 364, 410.1, 417/440, 505; 123/1 A, 196 R, 196 S, 196 V, 123/196 W, 197.1, 198 P; 137/565.3, 137/565.33, 565.35

See application file for complete search history.

(56) References Cited

U.S. PATENT DOCUMENTS

| | | | |
|---|---|---|---|
| 5,875,865 A * | 3/1999 | Wakahara et al. ............ 180/248 |
| 6,923,091 B2 * | 8/2005 | Hori et al. ................... 74/606 R |
| 6,941,922 B2 * | 9/2005 | Williams et al. .......... 123/196 R |
| 7,331,323 B2 * | 2/2008 | Hara ........................ 123/196 A |
| 2006/0065217 A1 * | 3/2006 | Ikegawa .................... 123/41.42 |
| 2009/0082153 A1 * | 3/2009 | Fujikawa et al. ............. 475/128 |
| 2011/0088990 A1 | 4/2011 | Shimizu et al. |

FOREIGN PATENT DOCUMENTS

| | | |
|---|---|---|
| JP | 2002-021993 | 1/2002 |
| JP | 2010-096304 | 4/2010 |

* cited by examiner

*Primary Examiner* — Devon Kramer
*Assistant Examiner* — Stephen Mick
(74) *Attorney, Agent, or Firm* — Morgan, Lewis & Bockius LLP

(57) ABSTRACT

A hydraulic pressure supply system of an automatic transmission for a vehicle may generate low hydraulic pressure and high hydraulic pressure using oil stored in an oil pan and may supply the low hydraulic pressure and the high hydraulic pressure respectively to a low pressure portion and a high pressure portion.

9 Claims, 2 Drawing Sheets

HYDRAULIC PRESSURE SUPPLY SYSTEM OF AUTOMATIC TRANSMISSION

CROSS-REFERENCE TO RELATED APPLICATION

The present application claims priority of Korean Patent Application Number 10-2012-0097301 filed on Sep. 3, 2012, the entire contents of which application is incorporated herein for all purposes by this reference.

BACKGROUND OF INVENTION

1. Field of Invention

The present invention relates to a hydraulic pressure supply system of an automatic transmission for a vehicle. More particularly, the present invention relates to a hydraulic pressure supply system of an automatic transmission for a vehicle which can improve safety and reliability as a consequence that the automatic transmission can be operated normally using hydraulic pressure of a low-pressure hydraulic pump when a high-pressure hydraulic pump is stopped.

2. Description of Related Art

Recently, vehicle makers direct all their strength to improving fuel economy due to worldwide high oil prices and strengthening of exhaust gas regulations.

Improvement of fuel economy may be achieved by improving power delivery efficiency in an automatic transmission, and improvement of the power delivery efficiency may be achieved by minimizing unnecessary power consumption of a hydraulic pump.

A recent automatic transmission is provided with a low-pressure hydraulic pump and a high-pressure hydraulic pump so as to improve fuel economy. Therefore, hydraulic pressure generated by the low-pressure hydraulic pump is supplied to a low pressure portion (i.e., a torque converter, a cooling device, and a lubrication device), and hydraulic pressure generated by the high-pressure hydraulic pump is supplied to a high pressure portion (i.e., friction members selectively operated when shifting).

In further detail, general hydraulic pressure of the automatic transmission is generated for the low pressure portion (i.e., generated by the low-pressure hydraulic pump), and hydraulic pressure demanded by the high pressure portion is generated by the high-pressure hydraulic pump and then is supplied to the high pressure portion.

Since power consumption for driving the hydraulic pumps can be minimized, fuel economy may be enhanced. In addition, since a load applied to the hydraulic pumps is reduced, noise and vibration may be reduced and durability may be improved.

Since hydraulic pressure generated by the low-pressure hydraulic pump is supplied to the high-pressure hydraulic pump and the high hydraulic pressure is generated by the high-pressure hydraulic pump according to a conventional hydraulic pressure supply system, the hydraulic pressure supplied to the high pressure portion is insufficient and vehicle cannot drive if the high-pressure hydraulic pump is out of order.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a hydraulic pressure supply system of an automatic transmission for a vehicle having advantages of improving safety and reliability when a high-pressure hydraulic pump is out of order or is stopped as a consequence of normally operating the hydraulic pressure supply system only by using hydraulic pressure of a low-pressure hydraulic pump.

A hydraulic pressure supply system of an automatic transmission for a vehicle may generate low hydraulic pressure and high hydraulic pressure using oil stored in an oil pan and may supply the low hydraulic pressure and the high hydraulic pressure respectively to a low pressure portion and a high pressure portion.

The hydraulic pressure supply system may include: a low-pressure hydraulic pump receiving the oil stored in the oil pan through a first input line, generating hydraulic pressure, and discharging the hydraulic pressure to a first low-pressure line; a first switch valve selectively opening or closing a hydraulic line through which the hydraulic pressure is supplied from the first low-pressure line; a low-pressure regulator valve connected to the first switch valve through a second low-pressure line, controlling the hydraulic pressure supplied through the second low-pressure line to be stable hydraulic pressure, and supplying the stable hydraulic pressure to the low pressure portion through a third low-pressure line; a high-pressure hydraulic pump increasing the hydraulic pressure supplied from the low-pressure hydraulic pump through the first low-pressure line, and discharging the increased hydraulic pressure to a high-pressure line; a second switch valve disposed between the first low-pressure line and the high-pressure line, and selectively connecting the first low-pressure line to the high-pressure line or not; a high-pressure regulator valve controlling the hydraulic pressure supplied from the high-pressure hydraulic pump through the high-pressure line and the hydraulic pressure supplied from the low-pressure hydraulic pump through the second switch valve to be stable high hydraulic pressure, and supplying the stable high hydraulic pressure to the high pressure portion; and a second input line connecting the oil pan to the first low-pressure line.

The low-pressure hydraulic pump may be a mechanical hydraulic pump driven by an engine, and the high-pressure hydraulic pump may be an electric hydraulic pump driven by an electric motor.

Each of the first switch valve and the second switch valve may be controlled by control pressure of a first solenoid valve that is an on/off solenoid valve.

The low-pressure regulator valve may supply a portion of the hydraulic pressure supplied from the second low-pressure line through a first supply line so as to control the hydraulic pressure of the second low-pressure line to be stable, and may supply the stable hydraulic pressure to a third low-pressure line.

The first supply line may be connected to the first input line.

The low-pressure regulator valve may be controlled by elastic force of an elastic member disposed at a side thereof and the hydraulic pressure of the second low-pressure line supplied to the other side thereof.

The high-pressure regulator valve may be selectively connected to the first low-pressure line through the second switch valve and may be directly connected to the high-pressure line so as to supply through a second supply line a portion of the hydraulic pressure supplied from the first low-pressure line or the high-pressure line and to control the hydraulic pressure to be stable.

The second supply line may be connected to the third low-pressure line.

The high-pressure regulator valve may be controlled by control pressure of a second solenoid valve, elastic force of an elastic member, and the hydraulic pressure of the first low-pressure line or the high-pressure line counteracting the control pressure of the second solenoid valve.

The second solenoid valve may be a proportional control solenoid valve.

A check valve for preventing back flow may be mounted on the second input line.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
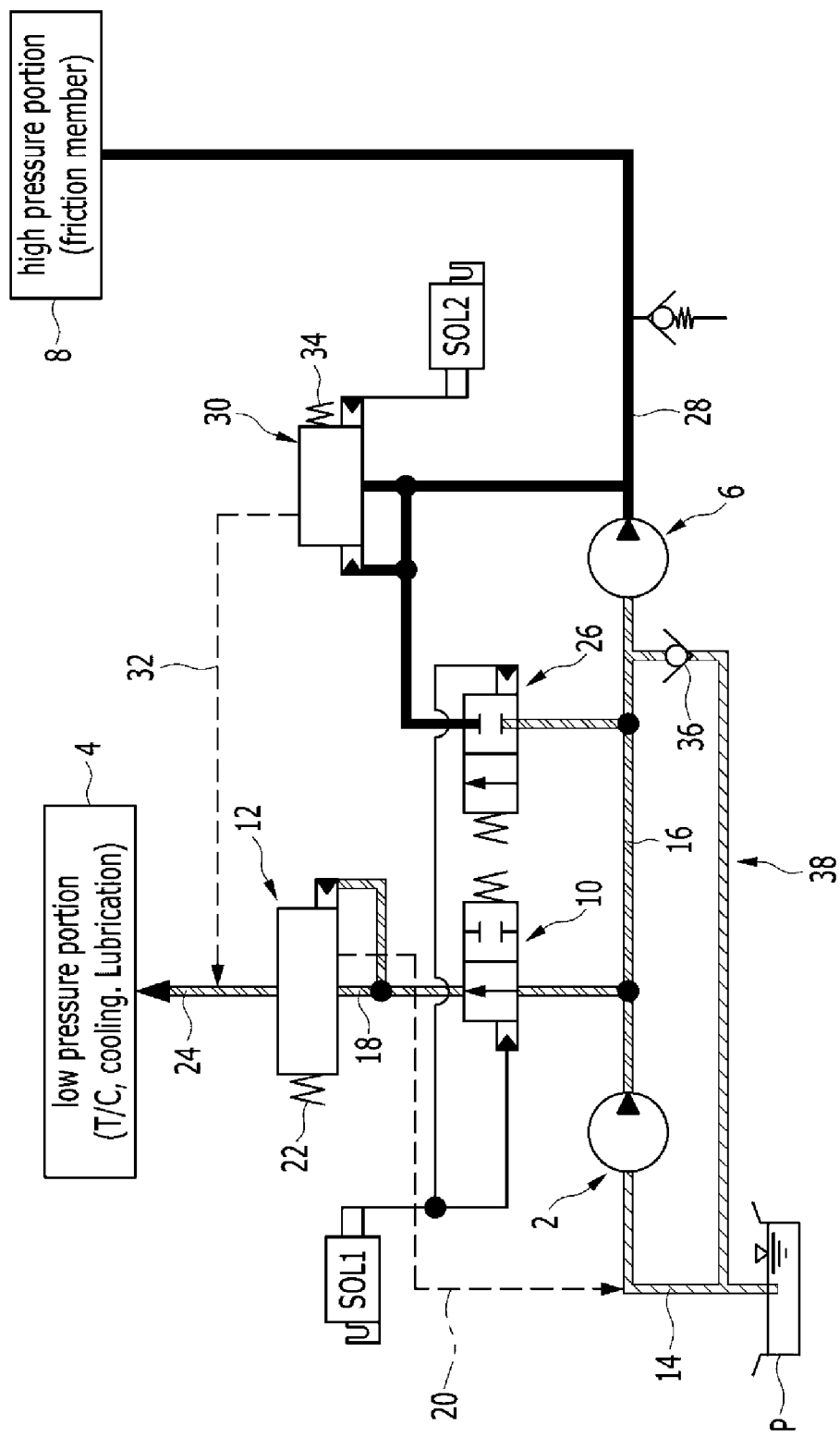
FIG. 1 is a schematic diagram of an exemplary hydraulic pressure supply system according to the present invention when a low-pressure hydraulic pump and a high-pressure hydraulic pump are operated normally.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a hydraulic pressure supply system according to various embodiments of the present invention when a low-pressure hydraulic pump and a high-pressure hydraulic pump are operated normally.

Referring to FIG. 1, a hydraulic pressure supply system according to various embodiments of the present invention is adapted to supply low hydraulic pressure generated by a low-pressure hydraulic pump 2 to a low pressure portion 4 such as a torque converter (T/C), a cooling portion, a lubrication portion and to supply high hydraulic pressure generated by a high-pressure hydraulic pump 6 to a high pressure portion 8 for operating friction members related to shifting.

The low hydraulic pressure is a lower pressure facilitating operation of the torque converter (T/C) and cooling and lubrication, and the high hydraulic pressure is a high pressure facilitating operation of a plurality of friction members.

The low hydraulic pressure is generated by the low-pressure hydraulic pump 2 and is supplied to the low pressure portion 4 through a first switch valve 10 and a low-pressure regulator valve 12.

The low-pressure hydraulic pump 2, as is well known to a person of an ordinary skill in the art, is a mechanical pump driven by torque of an engine. The low-pressure hydraulic pump 2 is connected to an oil pan P through a first input line 14, and the low hydraulic pressure generated by the low-pressure hydraulic pump 2 is discharged to a first low-pressure line 16.

The first switch valve 10 may be a spool valve and is controlled by a first solenoid valve SOL1 that is on/off-controlled so as to selectively deliver the hydraulic pressure of the first low-pressure line 16 to the low-pressure regulator valve 12.

That is, if the first solenoid valve SOL1 is switched off, the first switch valve 10 supplies the hydraulic pressure of the first low-pressure line 16 to the low-pressure regulator valve 12 through a second low-pressure line 18. If the first solenoid valve SOL1, on the contrary, is switched on, the first switch valve 10 is not connect the first low-pressure line 16 to the second low-pressure line 18.

The low-pressure regulator valve 12 is connected to the first switch valve 10 through the second low-pressure line 18 and is connected to the first input line 14 through a first supply line 20. Therefore, the low-pressure regulator valve 12 supplies a portion of the hydraulic pressure supplied from the first switch valve 10 to the first input line 14 through the first supply line 20 so as to control the hydraulic pressure.

That is, the low-pressure regulator valve 12 is controlled by elastic force of an elastic member 22 disposed at a side thereof and the hydraulic pressure of the second low-pressure line 18 supplied to the opposite side of the elastic member 22 so as to control the hydraulic pressure, and delivers the controlled hydraulic pressure to the low pressure portion 4 through a third low-pressure line 24. The elastic force of the elastic member 22 is set according to the hydraulic pressure demanded by the low pressure portion 4.

In addition, a second switch valve 26 connected to the first low-pressure line 16 selectively delivers the hydraulic pressure of the first low-pressure line 16 to the high pressure portion 8.

For this purpose, the second switch valve 26 may be a spool valve, and is controlled by the first solenoid valve SOL1 that is on/off-controlled so as to selectively deliver the hydraulic pressure of the first low-pressure line 16 to the high pressure portion 8.

That is, if the first solenoid valve SOL1 is switched off, the second switch valve 26 is not connect the first low-pressure line 16 to the high pressure portion 8. If the first solenoid valve SOL1, on the contrary, is switched on, the second switch valve 26 delivers the hydraulic pressure of the first low-pressure line 16 to the high pressure portion 8.

The high-pressure hydraulic pump 6 may be an electric pump driven by an electric motor. In addition, the high-pressure hydraulic pump 6 increases the low hydraulic pressure supplied through the first low-pressure line 16 to the high hydraulic pressure, and discharges the high hydraulic pressure to a high-pressure line 28. In addition, the hydraulic pressure discharged from the high-pressure hydraulic pump 6 to the high-pressure line 28 is controlled to be a stable high hydraulic pressure by a high-pressure regulator valve 30, and the stable high hydraulic pressure is supplied to the high pressure portion 8.

The high-pressure regulator valve 30 is connected to the high-pressure line 26 and is connected to the third low-pressure line 24 through a second supply line 30. Therefore, the high-pressure regulator valve 30 supplies a portion of the hydraulic pressure supplied through the high-pressure line 26 to the third low-pressure line 24 through the second supply line 30 so as to control the hydraulic pressure.

For this purpose, the high-pressure regulator valve 30 may be a conventional spool valve. In addition, the high-pressure regulator valve 30 is controlled by control pressure of a second solenoid valve SOL2 performing proportional control, elastic force of an elastic member 34, and the hydraulic pressure of the high-pressure line 28 counteracting the control pressure of the second solenoid valve SOL2. The elastic force of the elastic member 34 is set according to the hydraulic pressure demanded by the high-pressure line 28.

The second supply line 30 is connected to the third low-pressure line 24 so as to supply the hydraulic pressure to the low pressure portion 4 when only the high-pressure hydraulic pump 6 is operated.

In addition, the high-pressure hydraulic pump 6 is connected to the oil pan P through a second input line 38. A check valve 36 for preventing back flow is disposed on the second input line 38. Therefore, the high-pressure hydraulic pump 6 directly receives the oil from the oil pan P so as to generate the high hydraulic pressure when the hydraulic pressure is not supplied from the low-pressure hydraulic pump 2 to the high-pressure hydraulic pump 6.

When the low-pressure hydraulic pump 2 and the high-pressure hydraulic pump 6 are operated normally, the hydraulic pressure supply system according to various embodiments of the present invention supplies the low hydraulic pressure generated by the low-pressure hydraulic pump 2 to the low pressure portion 4 and supplies the high hydraulic pressure generated by the high-pressure hydraulic pump 6 to the high pressure portion 8, as shown in FIG. 1.

At this time, the first solenoid valve SOL1 is switched off, and the low hydraulic pressure generated by the low-pressure hydraulic pump 2 is supplied to the low-pressure regulator valve 12 through the first switch valve 10 so as to be controlled to be the stable low hydraulic pressure. After that, the stable low hydraulic pressure is supplied to the low pressure portion 4.

In addition, a portion of the low hydraulic pressure generated by the low-pressure hydraulic pump 2 is increased to the high hydraulic pressure by the high-pressure hydraulic pump 6, and the high hydraulic pressure is controlled to be the stable high hydraulic pressure by the high-pressure regulator valve 30 and is then supplied to the high pressure portion 8.

Figure 2:
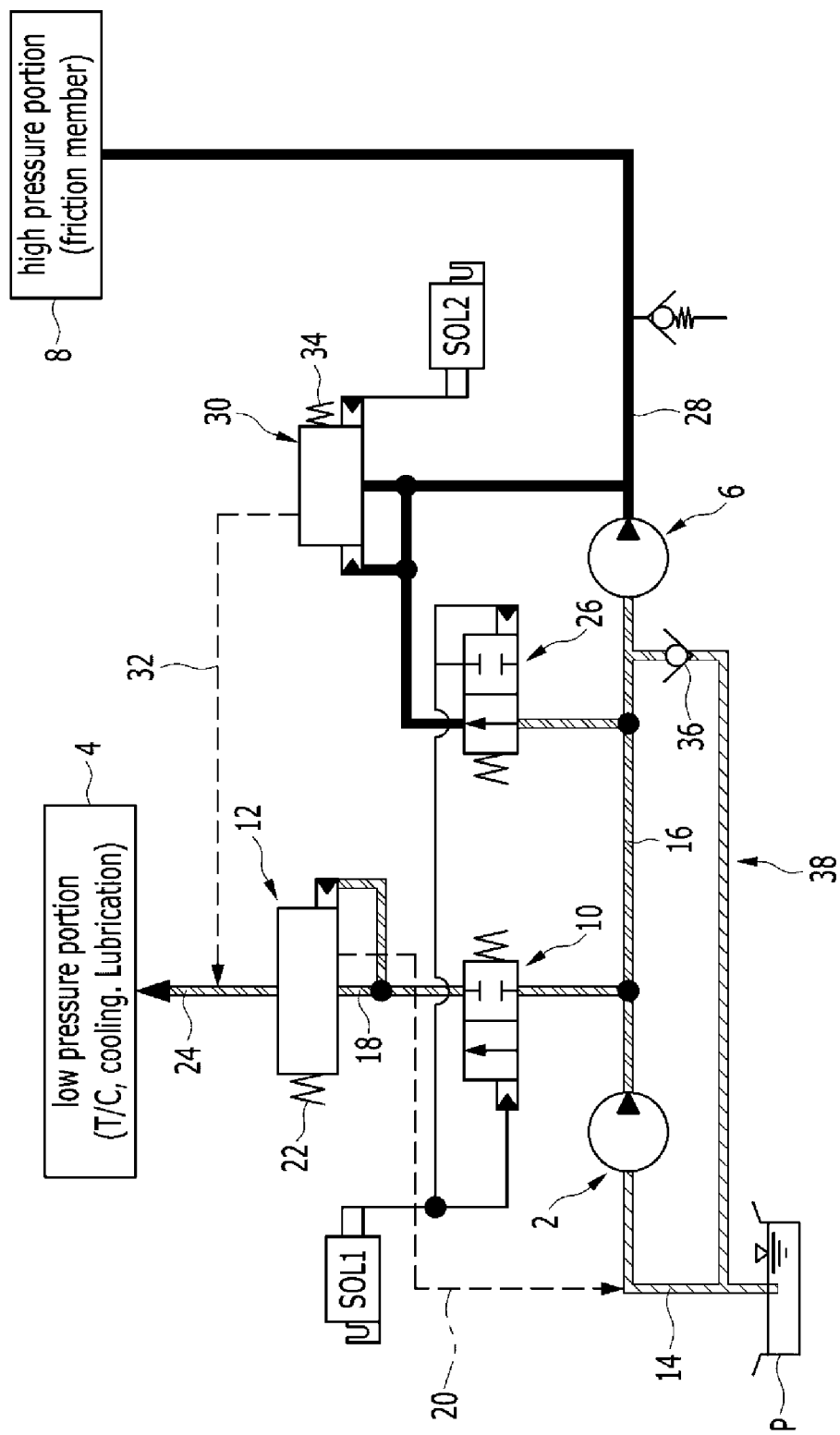
FIG. 2 is a schematic diagram of an exemplary hydraulic pressure supply system according to the present invention when a high-pressure hydraulic pump is operated abnormally.

FIG. 2 is a schematic diagram of a hydraulic pressure supply system according to various embodiments of the present invention when a high-pressure hydraulic pump is operated abnormally.

That is, oil flow when the high-pressure hydraulic pump 6 is not operated due to failure or lack of power in a battery is illustrated in FIG. 2. In this case, the first solenoid valve SOL1 is switched on.

At this time, the hydraulic pressure generated by the low-pressure hydraulic pump 2 is not supplied to the low-pressure regulator valve 12 by the first switch valve 10 and is supplied to the high-pressure line 28 by the second switch valve 26. In addition, the hydraulic pressure supplied to the high-pressure line 28 is controlled to be the high hydraulic pressure by the high-pressure regulator valve 30, and the high hydraulic pressure is supplied to the high pressure portion 8. Therefore, the high pressure portion 8 can be operated smoothly.

At this time the hydraulic pressure supplied from the high-pressure regulator valve 30 to the third low-pressure line 24 through the second supply line 30 is supplied to the low pressure portion 4. Therefore, the low pressure portion 4 can be operated smoothly.

Since the hydraulic pressure supply system is operated normally using the low-pressure hydraulic pump 2 when the high-pressure hydraulic pump 6 is not operated, safety and reliability of the hydraulic pressure supply system having two hydraulic pumps 2 and 6 may be improved.

Particularly, when the vehicle provided with the ISG system is stopped temporarily, the high hydraulic pressure may be supplied to the high pressure portion 8 in a state of engine stop. At this time, the high-pressure hydraulic pump 6 is operated so as to pump the oil in the oil pan P through the second input line 38 and generate the high hydraulic pressure. Therefore, the preparatory hydraulic pressure can be supplied to the high pressure portion 8.

That is, although the engine is stopped and the low-pressure hydraulic pump 2 is not operated, the high hydraulic pressure can be supplied to the high pressure portion 8 by operation of the high-pressure hydraulic pump 6.

According to various embodiments of the present invention, the low-pressure hydraulic pump 2 generates the low hydraulic pressure and the high-pressure hydraulic pump 6 generates the high hydraulic pressure by increasing the hydraulic pressure supplied from the low-pressure hydraulic pump 2. Therefore, power loss of the hydraulic pumps may be minimized, durability may be improved, noise and vibration of the hydraulic pumps may be reduced.

In addition, the hydraulic pressure supply system can be operated normally using the low-pressure hydraulic pump 2 when the high-pressure hydraulic pump 6 is not operated. Therefore, stability and reliability may be enhanced.

In addition, since the high-pressure hydraulic pump 6 can generate the high hydraulic pressure independently, the system may be applied to the vehicle having the ISG system.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hydraulic pressure supply system of an automatic transmission for a vehicle which generates low hydraulic pressure and high hydraulic pressure using oil stored in an oil pan, and which supplies the low hydraulic pressure and the high hydraulic pressure respectively to a low pressure portion and a high pressure portion, the hydraulic pressure supply system comprising:

a low-pressure hydraulic pump receiving the oil stored in the oil pan through a first input line, generating hydraulic pressure, and discharging the hydraulic pressure to a first low-pressure line;

a first switch valve selectively opening or closing a hydraulic line through which the hydraulic pressure is supplied from the first low-pressure line;

a low-pressure regulator valve connected to the first switch valve through a second low-pressure line, controlling the hydraulic pressure supplied through the second low-pressure line to be stable hydraulic pressure, and supplying the stable hydraulic pressure to the low pressure portion through a third low-pressure line;

a high-pressure hydraulic pump increasing the hydraulic pressure supplied from the low-pressure hydraulic pump through the first low-pressure line, and discharging the increased hydraulic pressure to a high-pressure line;

a second switch valve disposed between the first low-pressure line and the high-pressure line, and selectively connecting the first low-pressure line to the high-pressure line;

a high-pressure regulator valve controlling the hydraulic pressure supplied from the high-pressure hydraulic pump through the high-pressure line and the hydraulic pressure supplied from the low-pressure hydraulic pump through the second switch valve to be stable high hydraulic pressure, and supplying the stable high hydraulic pressure to the high pressure portion; and a second input line connecting the oil pan to the first low-pressure line, wherein the high-pressure regulator valve is selectively fluidly-connected to the first low-pressure line through the second switch valve and is directly fluidly-connected to the high-pressure line so as to supply through a second supply line a portion of the hydraulic pressure supplied from the first low-pressure line or the high-pressure line and to control the hydraulic pressure to be stable, and wherein the second supply line is connected to the third low-pressure line.

2. The hydraulic pressure supply system of claim 1, wherein the low-pressure hydraulic pump is a mechanical hydraulic pump driven by an engine, and the high-pressure hydraulic pump is an electric hydraulic pump driven by an electric motor.

3. The hydraulic pressure supply system of claim 1, wherein each of the first switch valve and the second switch valve is controlled by control pressure of a first solenoid valve that is an on/off solenoid valve.

4. The hydraulic pressure supply system of claim 1, wherein the low-pressure regulator valve supplies a portion of the hydraulic pressure supplied from the second low-pressure line through a first supply line so as to control the hydraulic pressure of the second low-pressure line to be stable, and supplies the stable hydraulic pressure to a third low-pressure line.

5. The hydraulic pressure supply system of claim 4, wherein the first supply line is connected to the first input line.

6. The hydraulic pressure supply system of claim 1, wherein the low-pressure regulator valve is controlled by elastic force of an elastic member disposed at a side thereof and the hydraulic pressure of the second low-pressure line supplied to the other side thereof.

7. The hydraulic pressure supply system of claim 1, wherein the high-pressure regulator valve is controlled by control pressure of a second solenoid valve, elastic force of an elastic member, and the hydraulic pressure of the first low-pressure line or the high-pressure line counteracting the control pressure of the second solenoid valve.

8. The hydraulic pressure supply system of claim 7, wherein the second solenoid valve is a proportional control solenoid valve.

9. The hydraulic pressure supply system of claim 1, wherein a check valve for preventing back flow is mounted on the second input line.

\* \* \* \* \*